United States Patent [19]

Huber

[11] Patent Number: 5,078,865

[45] Date of Patent: Jan. 7, 1992

[54] APPLIANCE FOR THE REMOVAL OF RAKINGS AND/OR SCREENINGS OUT OF LIQUID FLOWING IN A LAUNDER

[76] Inventor: Hans G. Huber, Zum Rachental 8, D-8434 Berching, Fed. Rep. of Germany

[21] Appl. No.: 502,530

[22] Filed: Mar. 30, 1990

[30] Foreign Application Priority Data

Mar. 31, 1989 [DE] Fed. Rep. of Germany ....... 3910389

[51] Int. Cl.$^5$ .......................... B01D 35/02; E02B 5/08; E02B 8/02; E03F 5/14
[52] U.S. Cl. .................................... 210/162; 209/261; 209/300; 209/393; 210/415; 210/497.01
[58] Field of Search .................. 100/117; 198/676; 209/261, 281, 913, 300, 393; 210/158, 159, 162, 415, 413, 497.01; 29/163.8; 408/713

[56] References Cited

U.S. PATENT DOCUMENTS

| | | | |
|---|---|---|---|
| 864,507 | 8/1907 | Brunotte | 210/162 |
| 1,699,798 | 1/1929 | McEvoy et al. | 29/163.8 |
| 2,491,912 | 12/1949 | Walker | 210/415 |
| 2,929,504 | 3/1960 | Lino et al. | 210/162 |
| 3,865,727 | 2/1975 | Broling et al. | 210/162 |
| 4,566,828 | 1/1986 | Reinauer | 408/713 |
| 4,634,524 | 1/1987 | Huber | 210/158 |

FOREIGN PATENT DOCUMENTS 2643178 4/1977 Fed. Rep. of Germany ...... 210/159

Primary Examiner—Robert A. Dawson
Assistant Examiner—Joseph Drodge
Attorney, Agent, or Firm—Max Fogiel

[57] ABSTRACT

The invention relates to a device for the removal of particles and/or screenings from a liquid running in a laundry. A screen with openings in the shape of a cylinder jacket reaches into the laundry and is tilted upwards. The screen is partly immersed in the liquid, and parallel haulage track for the material is provided. The track is located spaced from the screen, and has the form of a screw conveyor with a housing, a shaft and a conveyor helix. The conveyor helix moves alongside the screen and picks up the material and transports it upwards. The openings with their lengthwise direction are inclined relative to the axis of the cylindrical jacket-shaped screen so that they are situated approximately parallel to the effective direction of the total force exerted on the material by the conveyor helix.

7 Claims, 2 Drawing Sheets

APPLIANCE FOR THE REMOVAL OF RAKINGS AND/OR SCREENINGS OUT OF LIQUID FLOWING IN A LAUNDER

BACKGROUND OF THE INVENTION

The invention relates to a device for the removal of particles and/or screenings from a liquid running in a laundry. An upwardly-inclined screen with penetration gaps or openings in the shape of a cylinder jacket reaches into the laundry, and is partly immersed in the liquid. A parallel conveying track for the material is located away from the screen, in the form of a screw conveyor device, with a housing, a shaft and a conveyor helix which moves alongside the screen and thus picks up the material and transports it upwards.

Such a device may be used for different particles and/or screenings, for example, in the area of sewage technology, and also for filtering plastics residues out of liquids. The description herein always refers to the separation of mostly solid particles and/or screenings and a liquid.

A device of the type described above is known from DE-PS 37 16 434. This device consists of a screw conveyor with housing, shaft and conveyor helix forming a conveying track. The shaft with the conveyor helix is driven by a motor. In its lower section which is immersed in water, the housing of the screw conveyor is substituted at least partly by the screen. The screen consists of screen bars extended throughout a total screen height located in axial direction; that is, parallel to the axis of the shaft of the screw conveyor, and running alongside a cylindrical circumference. In this way, openings through which the liquid can pass, but particles starting from certain dimensions may not pass, are formed in between the grate bars and parallel to the axis of the screw conveyor. The conveyor helix passes alongside the openings of the screen and picks up the particles in the conveying direction. The screen bar sections are triangular or trapezoid in shape with rounded-off edges. The locations of these sections are such that a triangular or trapezoid side of the section points tangentially to the rotating direction of the conveyor helix, causing a narrowest point of the opening on a smallest possible radius to be connected to a proportionally widening, free section of the opening in the flow direction of the liquid. The screen bars forming the opening are interconnected at the outside by supporting bars. The openings are of a relatively great length in the axial direction and extend over almost t he entire screen, even though they are held in place at the outside at certain intervals by supporting bars. If such devices are used in sewage technology, it is unavoidable that the device be not only coated by the real particles but coated in the laundry also, by stones and especially stone chips, as used for putting on icy winter roads, which get into the range of the conveyor helix and of the opening. These stone chips have sharp edges, which put the device under strain in several ways. The stone chips act notably aggressive, thus causing great wear and tear on the screen material. This is accompanied by a deformation of the continuous screen bars, because the stone chips get stuck in the opening gap between the conveyor helix and the screen bars, giving rise to considerable forces exerted by the conveyor helix on the screen bars. The opening is thereby formed by way of the pinched stone, leading to a shattering of the stones. This is not the function of a device for the removal of particles from a laundry, but which could still be tolerated. However, it is much less desirable that the screen bars be bent under this excessive application of forces, i.e., in tangential direction. With this, the opening width is altered and eventually the screen bars are separated from the supporting bars, torn up, and then grazed by the conveyor helix. It has been observed in a device of the type described at the outset that a screen installed in a sewage treatment plant, that was clogged with stone chips was totally destroyed in two days of operation. Another disadvantage of the device with such a screen is insufficient self-cleaning. Through the lateral application of forces between conveyor helix and particles that occurs inclined to the lengthwise direction of the opening, there exists a tendency that the particles are again and again pressed into the opening. Thus, the openings get more clogged so that the liquid may not pass through them. An increase of the liquid level signals the adverse effect.

SUMMARY OF THE INVENTION

The invention is based on the object of improving a device of the type previously described in such a way that the strain on the wall of the screen forming the opening exerted by hard objects, such as stone chips, is considerably reduced, so that even with adverse particle mixtures longer operating times become possible.

This object is achieved, according to the invention, in that the opening with its lengthwise direction is inclined to the axis of the cylindrical jacket-shaped screen in such a way that it is approximately parallel to the effective direction of the total force exerted on the material by the conveyor helix. The openings are no longer parallel to the axis of the screw conveyor but are inclined at an angle determined by the effective direction of the total force exerted on the material by the conveyor helix. Exact compliance with this angle is not of primary importance. It suffices to have a similar angle, so that a stone picked up by the conveyor helix may put a strain on the opening of the grate parallel to its lengthwise extension but not transverse to it. Thus, the stone is pushed along in the longitudinal opening by the conveyor helix. The longitudinal opening does not put up much resistance against the conveying direction of the stone. Only at the end of the longitudinal opening, the stone encounters a wall area which is transverse to its conveying direction. However, in this zone the span is far smaller. During the conveying motion of a stone in the lengthwise direction of the opening there exists a higher self-cleaning effect; in the course of its longitudinal motion, the stone scrapes the opening clean. The danger of coating or clogging is thus reduced.

Also, the inclined location of the axis of the device in the laundry is to be considered. The effective direction of the total force only results in the lower area of the screen circumference, where the weight of the stone does not cause a rolling to the side. If the stone in the opening located laterally upwards at the screen wall is picked up, the stone has the tendency to fall down after having been carried over a certain angle within the screen, until it will again be in contact with the conveyor helix. For manufacturing reasons, it is unavoidable to maintain this inclined angle in which the openings are located, at least over a part of the housing circumference forming the grate. The essential angle of inclination of the effective direction of the total force is determined at the lower penetration point of the cylindershaped housing, where the conveyor screw is inclined to the axis of the passing conveyor.

Naturally, the angle of the effective direction of the total force of the conveyor helix exerted on the particles depends on various factors, including the kind of material, the amount of friction between particles and screen, and the inclination of the conveyor helix. An inclined conveyor helix must exert mainly two forces on the particles which add up vectorially to the described total force. One force is directed tangentially in the circumferential direction of the cylindrical jacket-shaped screen and is essential for overcoming the friction exerted by the housing or the screen on the particles. The other force acts vertically on the conveyor helix and determines the conveying path of the particles, thus constituting the conveying component. For different combinations of particles the effective direction of the total force may be determined by experiments, to adjust the inclination into which the lengthwise direction of the openings is directed.

The ends of the openings pointing in the effective direction of the total force are advantageously equipped with shear bars possessing cutting edges. In this way, it becomes possible to part fibrous material such as paper or textiles at the outting edges, so as to avoid entanglements. By means of the self-cleaning effect, the opening is always cleaned of hard particles, particularly stone chips.

For reasons of efficacy, the openings may have a length L in the effective direction of the total force that is approximately five to thirty times greater than the opening width s. In other words, the length L to the gap width s is:

$$L \approx 5 \text{ to } 30 \times s.$$

It is essential not to design the openings with excessive lengths so that the screen will be of a much greater stability. This would not be the case if the openings continued throughout the total length of the screen. Such a length L in the lengthwise direction of the opening already covers a predetermined angle in the circumferential direction, across which the effects of the weight on the particles change. As a consequence, harder particles such as small stones located in an opening, drop out in the longitudinal direction during the lateral upwards motion and thus recede entirely to the interior chamber of the screen. For this reason, the ends of the opening are under relatively low strain, and the crushing action on small stones is far less significant than with current devices.

The openings may possess sections which become wider in the penetrating direction so that particles or stones smaller than the opening width will no get stuck in the openings but will be carried on by the passing liquid.

For reasons of efficacy, the opening and the shear bars with cutting edges may be manufactured by the milling of a flat plate which is later bent in the shape of a cylinder jacket, to form the screen. For this purpose, a disk milling cutter with an axis located transversely to the lengthwise direction of the opening is used. In this way, not only is the opening itself created, but in the same work process the shear bar with its cutting edges is manufactured. Milling may be done on a flat plate which then is given the shape of a cylinder jacket by means of a bending process. A milling process for the creation of the opening on a plate which has already been given the shape of a cylinder jacket would be more complicated but possible. The location of the shear bars results in a totally different stability than that of the current application of screen bars with triangular sections having rounded-off edges joined by a welding process.

The part of the housing forming the screen may be designed as removable so that the screen may be easily replaced. It is even possible to try out screens having different degrees of inclination of the main direction of the opening in order to discover the best adjustment for the specific particles.

The angle of the total force of the conveyor helix on the particles and thus the angle $\beta$, formed by the lengthwise direction of the opening and a plane that is vertical to the axis of the screw conveyor, depends on many factors. The friction between the particles and the housing, which needs to be overcome, is of importance. In general, it may be said that the angle $\beta$ is between 25 and 60°, whereas the angle $\alpha$, formed by the conveyor helix and a similar plane, is between 10 and 30°. For the angle $\beta$ the following standard values, which may be determined by experiments in a more precise way, may be specified as follows:

screening of sewage sludge: $\beta \approx 30$ to 45°
screening of communal waste water
screening of process water: $\beta \approx 35$ to 60°
e.g. extraction of polymers
in the chemical industry: $\beta \approx 25$ to 50°
screening of slaughterhouse
waste water: $\beta \approx 30$ to 50°

BRIEF DESCRIPTION OF THE DRAWINGS

An example of an embodiment according to the invention is further represented and described by the drawings.

DESCRIPTION OF THE PREFERRED EMBODIMENTS

Figure 1:
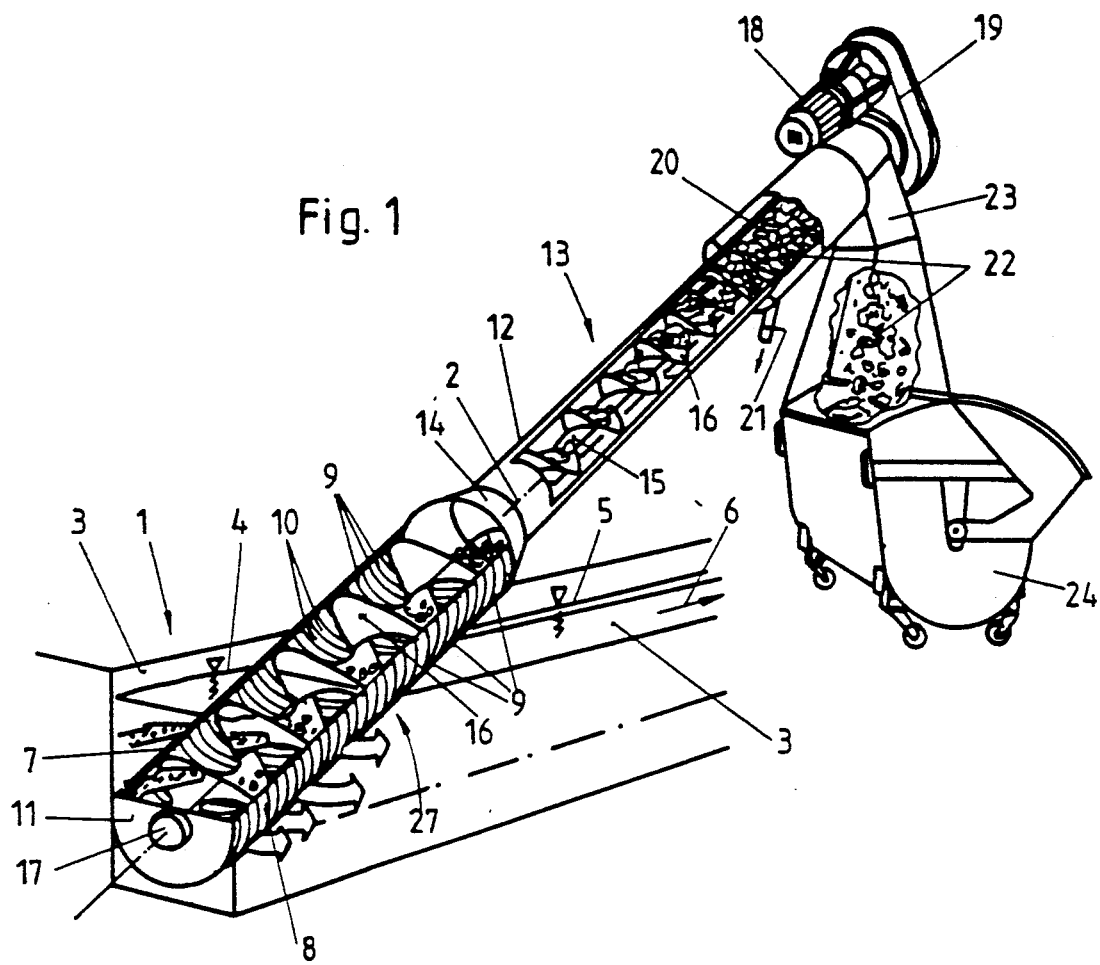
FIG. 1 is a diagrammatic, perspective representation of the device as a whole.

In a laundry 1 diagrammatically represented in FIG. 1, the device with its axis 2 is inclined in such a way that part of it connects to the lateral walls 3 of the laundry 1 in which there is a water level 4 ahead of the device and a comparatively lower water level 5 after the device so that the liquid flows through the laundry 1 in the direction of an arrow 6.

In its lower section, the device is equipped with a screen 7 which extends over a height parallel to the axis 2, such that the lower section which reaches into the water level 4 will permanently remain in the water, providing for different water levels. The screen 7 spans across a part of the circumference. It has a wall 8 which as a rule is made of a bent plate of special steel, located parallel to the axis 2 at the surface line of the cylinder. The wall 8 may also be divided into various segments forming cylindrical segment areas. In the wall 8 there are openings 10, that are limited by shear bars 9. The shear bars 9 ware located at the one end of the direction of the main extension of the opening 10. The screen 7 may also be equipped with a sheet-metal face 11 at its lower end, constituting an additional support for the wall forming the screen 7.

Connected to the screen 7, in a diagonally upward direction, is a housing 12 of a screw conveyor 13 with a cylindrical jacket area. In the housing, which is also equipped with a conical shoulder 14, there is a shaft connected to or carrying a conveyor helix 16. The conveyor helix 16 extends over the total length of the device; it also projects into the part of the device where the screen is located. According to FIG. 1, no shaft 15 is provided nor installed, and the conveyor helix 16 has a greater diameter than further up, and adapted to the interior diameter of the wall 8. Yet it is also possible to extend the shaft 15 up to the rang of the sheet-metal face 11, so that the conveyor helix 16 is carried by the shaft 15 in its entire lengthwise extension. The lower end of the conveyor helix 16 may be supported by a bearing 17 in the range of the sheet-metal face 11. At the upper end of the housing, there is a further bearing which is not represented in this context. There are also a motor 18 and a transmission 19 by way of which drive the shaft 15 and thereby also the conveyor helix 16. The conveyor helix 16 may have a variable inclination and form. A compacting zone 20 at the upper end of the conveying track, in whose range the conveyor helix has a smaller slope, is represented. In this area the housing is designed in a double-walled way, the interior part of the wall having openings so that liquids extracted during the compacting or compressing of the particles may be directed back to the laundry 1 by way of a pipe 21, while the compacted particles 22 are cast into a container 24 via a conveyor chute 23.

Figures 2, 3:
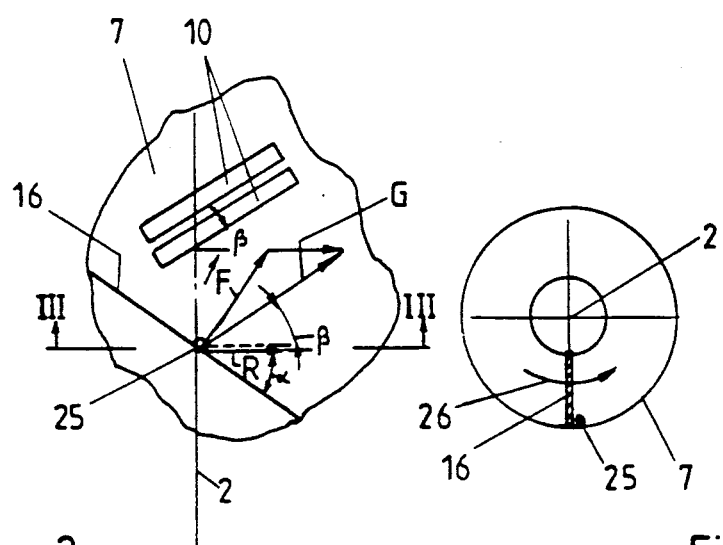
FIG. 2 is a diagram for the clarification of the forces acting on particles in the lower range of a conveyor track.
FIG. 3 is a section pertaining to FIG. 2 taken along line III—III in FIG. 2.

As may already be seen in FIG. 1, the main extension direction of the openings 10 is situated diagonally to the axis 2. FIGS. 2 and 3 show the force conditions and are to be viewed in the same context. FIG. 2 represents the axis 2 of the device, and below the axis in the drawing plane it is possible to see, the part of the screen 7 which is located at the bottom in FIG. 3, i.e., in the range of the conveyor helix 16. There, a stone chip 25 is represented which is picked up by the conveyor helix 26 and transported laterally upwards at the screen in the direction of rotation according to the arrow 26 of the conveyor helix 16. FIG. 2 represents the state existing during the flowing through or the action of the conveyor helix 16 on the stone chip 25 at the lowest surface line. In this case, the conveyor helix 16 needs to overcome the friction force which the screen 7 exerts on the stone chip 25. This friction force is represented as a dotted line in the drawing.

The friction force acts tangentially at the circumference of the cylindrical screen 7. The conveyor helix 16 must be able to exert the inversely directed force R, in order to overcome the friction force of the screen 7 which attacks tangentially the stone chip 25. If the conveyor helix 16 were parallel to the axis 2, this would be the only force it would need to exert. However, conveying action would then be zero. Therefore, the conveyor helix 16 is located diagonally to the axis 2, i.e., at an angle $\beta$ which exists between a plane vertical to the axis 2 and the area of the conveyor helix 15. In addition to the force R, the conveyor helix 16 must exert a conveying force F on the stone chip 25. This force F is vertical to the area of the conveyor helix 16. By vector addition a total force G, which may be considered as a resultant force, is obtained from the two forces R and F. This resultant force is set at an angle $\beta$ to a plane which is also vertical to the axis 2 and runs through the point of attack at the stone chip 25. Thus, the angle $\beta$ determines the effective direction of the total force G exerted on the particles by the conveyor helix 16. Accordingly, also the openings 10, of which for reasons of clarity only two are represented in FIG. 2, are located diagonally at the angle $\beta$. In this case, the main extension direction of the openings 10 is essential. They need to extend alongside; that is, parallel to the effective direction of the total force. The exact compliance with this effective direction is not of the utmost importance. It is enough if the direction remains within a certain range. This is explained by the fact that FIG. 2 shows the conditions at the lowest jacket line and that conditions in the sideways ascending area change, when the conveyor helix 16 is turned further, because the weight acting on the stone chip 25 contains a component letting the stone chip 25 roll down at the walls against the conveying direction.

FIG. 4 clarifies again the design of the screen 7. It represents a view at the outside surface of the screen 7, i.e., approximately in the direction of the arrow 27 in FIG. 1. One recognizes that the screen 7 consists of a continuous wall 8 formed by single, unconnected, yet parallel openings 10. The lengths of the openings 10 run parallel to the diagonal direction according to the angle $\beta$. Two adjacent openings 10 are separated from a rib 28. Transverse to the lengthwise extension of the opening 10 and to the ribs 28 there are shear bars 29 mae of the material of the wall 8. These shear bars possess cutting edges 30 at both ends of the longitudinal gap 10. However, only one direction will be active. Connected to the cutting edges 30 are wedge faces 31 that result from the manufacturing process. The openings 10 may be milled out of the wall 8 by the milling machine. The wedge faces 31 appear as a consequence of the material thickness of the wall 8. The cutting edges 30 are created at the same time without necessitating a separate work process.

Figure 4:
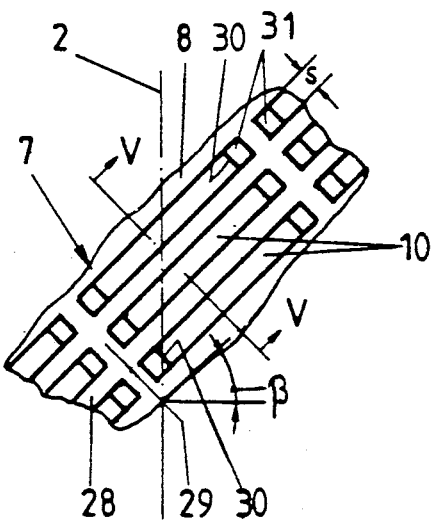
FIG. 4 is the representation of a screen section.
Figure 5:
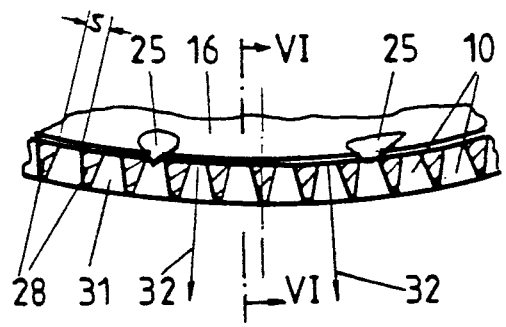
FIG. 5 is a section taken along line V—V in FIG. 4 in the lower circumferential range.
Figure 6:
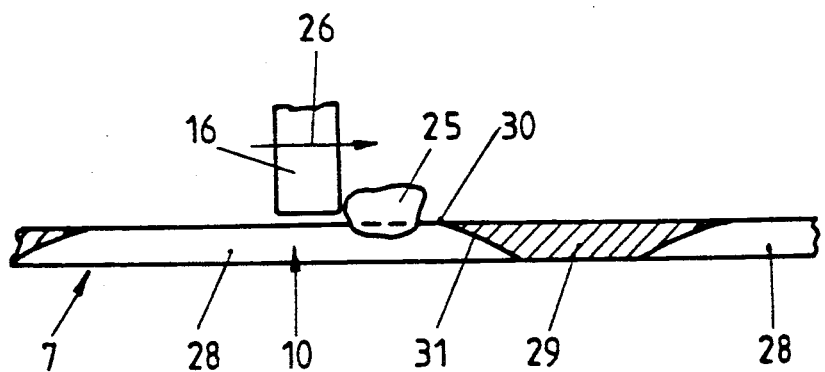
FIG. 6 is a section taken along line VI—VI in FIG. 5, unrolled into the plane.

FIG. 5 shows a section according to line V—V in FIG. 4. It can be seen by looking in the conveying direction of the conveyor helix 16, that the openings 10 extend vertically to the drawing plane. Towards the outside, the diameter for the liquid become wider in flow direction according to arrow 32, so that a stone chip 25 smaller than the opening width may pass on to the outside without difficulties, guaranteeing thereby that it will not clog the openings 10. The conveyor helix 16 pushes the stone chips 25 in the direction of the angle $\beta$, i.e., along the openings 10 so that the edges of the ribs which confine the openings 10 are cleaned again and again. This self-cleaning effect is far more significant than that of conventional devices, because the conveying direction of the stone chips 25 corresponds to the lengthwise extension direction of the opening 10. In FIG. 6 the conditions are specified once more. The representation there shows a section taken along line VI—VI in FIG. 5, i.e., 90° with respect to the representation in FIG. 5. In addition, the screen 7 is unrolled into the plane. One recognizes there that the conveyor helix 16, moving according to arrow 26, acts on the stone chip 25 in a way that the stone chip 25 is pushed along in the opening 10 until it gets to a cutting edge 30 of the shear bars 29. Here, due to a weight component acting on the stone chip 25, the tendency exists that a rolling out or coming out of the opening 10 is favored. Besides, the cutting edges 30 extend only by the opening width s transversely to the conveying direction, so that these cutting edges 30 are of very high stability and cannot be separated or torn apart, by pressure, as in the case with screen bars located, for example, in an axial way and parallel to the axis 2.

I claim:

1. An arrangement for removing particles from a liquid running in a waste water treatment unit comprising: a tank for containing liquid; a screen extending into said tank and having openings and shape of a cylindrical jacket tilted upwards and partly immersed in said liquid; a screw conveyor within said screen and having means comprising a conveyor helix spaced from said screen and forming a conveying track for conveying particles; said screw conveyor having a housing and a shaft mounting said conveyor helix, said conveyor helix moving adjacent said screen and spaced therefrom for picking up said particles and transporting said particles upwards; said screen and said screw conveyor having parallel lengthwise axes; said conveyor helix exerting a total force on said particles, said total force having an effective direction; said openings having lengthwise axes inclined to said conveyor axes and located substantially parallel to the direction of said total force; said conveyor helix being spaced from said screen from preventing substantial shearing effects of said conveyor helix relative to said screen and allow re-entry of particles of that have passed out through said openings.

2. An arrangement as defined in claim 1, wherein said openings have ends pointing in said direction of said total force; and further comprises shear bars at said ends of said openings having cutting edges.

3. An arrangement as defined in claim 2, wherein said screen comprises a milled flat plate bent in shape of a cylindrical jacket, said openings and said shear bars with said cutting edges being also comprised of said milled flat plate.

4. An arrangement as defined in claim 3, wherein said screen is replaceable.

5. An arrangement as defined in claim 1, wherein said openings have an elongated shape with a length and a width, said length being in said effective direction of said total force and being substantially five to thirty times greater than said width.

6. An arrangement as defined in claim 5, wherein said openings have a section widening in a direction of said length.

7. An arrangement for removing particles from a liquid running in a wastewater treatment unit comprising: a tank for containing liquid; a screen extending into said tank and having openings and shape of a cylindrical jacket tilted upwards and partly immersed in said liquid; a screw conveyor within said screen and having means comprising a conveyor helix spaced from said screen and forming a conveying track for conveying particles; said screw conveyor having a housing and a shaft mounting said conveyor helix, said conveyor helix moving adjacent said screen and spaced therefrom for picking up said particles and transporting said articles upwards; said screen and said screw conveyor having parallel lengthwise axes; said conveyor helix exerting a total force on said particles, said total force having an effective direction; said openings having lengthwise axes inclined to said conveyor axes and located substantially parallel o the direction of said total force; said conveyor helix being spaced from said screen for preventing substantial shearing effects of said conveyor helix relative to said screen and allow re-entry of particles that have passed out through said openings; said openings having ends pointing in said effective direction of said total force; shear bars at said ends of said openings and having cutting edges; said openings have an elongated shape with a length and a width, said length being substantially five to thirty times greater than said width, said length being along said effective direction of said total force; said openings having a section widening along said length; said screen comprising a milled flat plate bent in shape of a cylindrical jacket, said openings and shear bars with said cutting edges being also comprised of said milled plate, said screen being replaceable.

* * * * *